March 12, 1929. J. N. CRAMER 1,705,441
RAKE
Filed Dec. 18, 1925
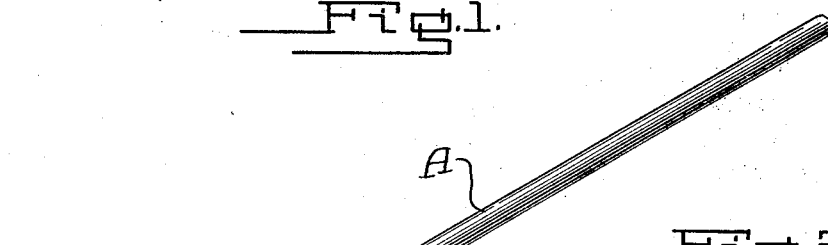
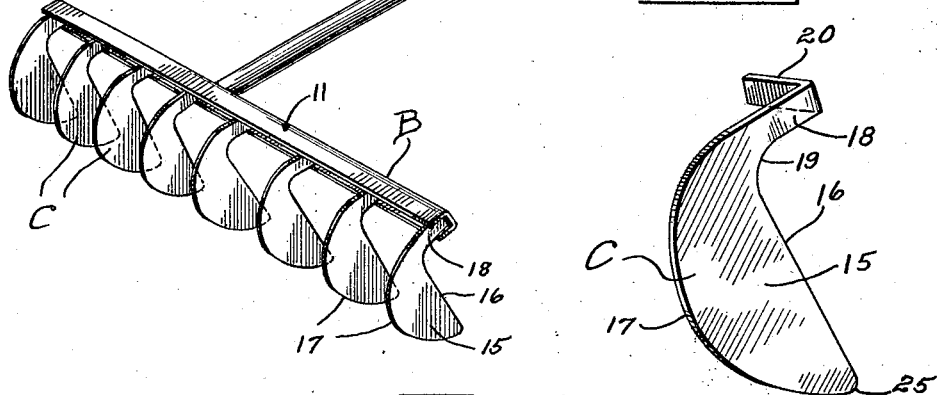
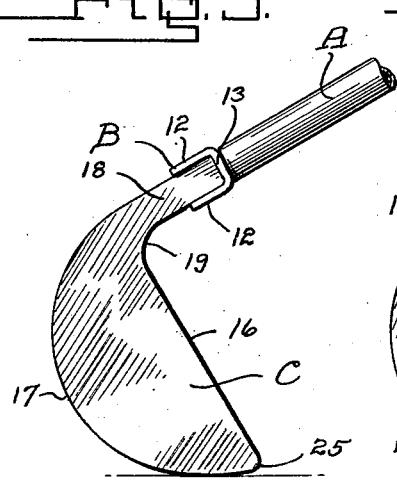
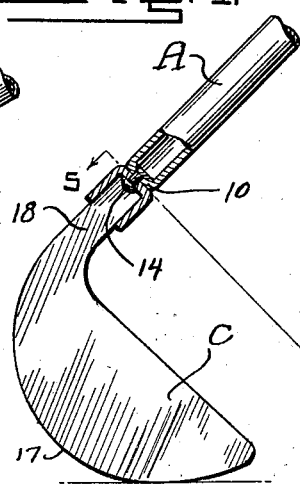
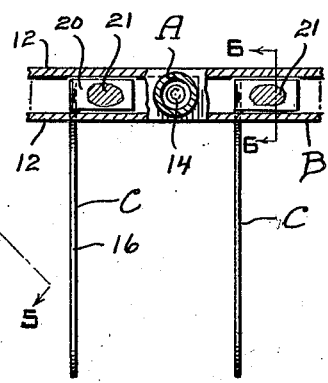
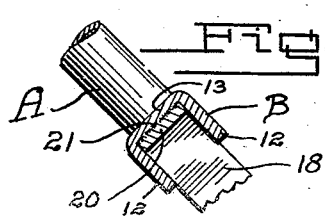
John N. Cramer, Inventor Patented Mar. 12, 1929.

1,705,441

UNITED STATES PATENT OFFICE.

JOHN N. CRAMER, OF MARTINSVILLE, INDIANA.

RAKE.

Application filed December 18, 1925. Serial No. 76,328.

The present invention relates to improvements in rakes.

Rakes constructed in the usual manner, and having a plurality of sharply pointed teeth are not found very satisfactory for purposes such as raking leaves, grass, or trash of any kind, for the reason that the teeth become so clogged with the material being raked as to make it necessary for the operator to clean the teeth with his hands, and thus making the raking procedure very tiring.

It is therefore a primary object of the present invention to provide an improved rake having the teeth thereof so constructed as to eliminate clogging of the teeth when raking leaves, grass or trash of various descriptions.

A further object of the invention is to provide an improved rake having the teeth thereof so formed that should any small amount of material adhere to the teeth, the same may be readily removed from the teeth by moving the rake in a direction from the operator with the teeth engaging the ground.

A still further object of the invention resides in the specific formation of the teeth, which are so formed at their lower ends that leaves or trash pierced by the teeth may be readily shaken from the teeth.

A still further object of the invention is to provide an improved rake which is simple and durable in construction, and one wherein should one tooth become broken, a new tooth may be readily and easily substituted therefor.

Other objects and advantages will be apparent during the course of the following detailed description, taken in connection with the accompanying drawing forming a part of this specification and in which drawing:

Figure 1 is a perspective view of a rake constructed in accordance with my invention.

Figure 2 is a perspective view of one of the rake teeth.

Figure 3 is a side elevation of the rake, the handle being broken away.

Figure 4 is a transverse section through the rake head at its point of connection with the handle portion of the rake.

Figure 5 is a section taken substantially on line 5—5 of Figure 4; and

Figure 6 is an enlarged fragmentary transverse section on line 6—6 of Figure 5.

In the drawing, wherein similar reference characters designate corresponding parts throughout the several views, the letter A designates a handle, B a head or cross member, and C the teeth adapted to be connected with the head B.

The handle A which may be formed either of wood or metal, in the example shown consists of a tubular member having its forward end closed as at 10.

The head or cross member B preferably consists of a channel shaped member 11 preferably formed of metal of a suitable gauge. The channel shaped head 11 embodies forwardly extending parallel spaced apart flanges 12 connected at their rear edges by a base plate 13. The base plate 13 may be connected centrally of its ends to the closed end 10 of the handle A as by means of a suitable bolt or rivet 14. If desirable, diagonally extending brace rods may be connected to the handle and extend to the head B to each side of its connection with the handle portion. As will be clearly seen in Figures 3 and 4, the channel shaped member 11 opens to the front of the rake.

Referring now to the improved rake teeth C, the same in the example shown are formed of sheet metal stampings. The teeth C are formed with main body portions 15 of substantially semi-circular shape, and forming a straight rear edge 16 and an arcuate forward edge 17. Extending rearwardly from the upper portion of the main body portion 15 are necks 18 which preferably have their lower edges merging into the rear edge 16 in an arc as at 19. These neck portions 18 are preferably of a width to snugly fit between the flanges 12 of the head B. Bent at a right angle from the rear end of the neck 18, is an attaching foot 20 which is adapted to lie in surface contact with the inner face of the base plate 13. The attaching feet 20 may be riveted or otherwise secured to the base plate 13, and in the example shown a weld 21 has been made for securing the teeth to the head B.

The teeth C, and any desired number of which may be disposed along the head B, enlarge rapidly from their lower blunt points 25 so that any leaves or trash which may have been pierced by the teeth may be readily shaken off. It will be observed from Figures 3 and 4 that the neck 18 projects rearwardly past the head B for increasing the capacity of the rake, in that the material being raked will not fall back over the head of the rake.

Connecting the teeth to the channel shaped member 11 merely by the right angular attaching feet 20, permits of the neck portions 18 to yield laterally of the head from their point of connection with the attaching feet. It will also be observed that by so having the lower edge of the neck portions curving into the leading edge 16 of the blades as at 19, a stronger tooth will be formed and there will be no sharp corners at the rear edges of the teeth for catching and holding any of the material being raked.

From the foregoing description it will be seen that a novel rake has been provided wherein the liability of material becoming clogged between the teeth of the rake has been reduced to a minimum.

Various changes may be made to the specific form of invention herein shown and described without departing from the spirit of the invention or the scope of the following claims.

I claim:

1. In a rake comprising a handle and a cross member, a plurality of teeth arranged equidistantly apart along the cross member each of like formation and embodying sheet-like body portions disposed in parallel planes and having straight leading edges and forwardly curving trailing edges arcuated throughout their length.

2. A rake comprising a handle portion, a channel shaped head connected transversely of the handle and opening forwardly, and a plurality of individual sheet metal teeth spaced throughout the length of the head, said teeth embodying sheet like main body portions having straight leading edges and forwardly curved trailing edges, integral sheet like neck portions extending forwardly in a like plane with the main body portion from the upper end of the leading edge with their edges engaging the confronting faces of the flanges of said head, and right angularly bent attaching feet at the forward end of each neck portion for attachment in surface contact to the inner face of the base plate of said channel shaped head.

JOHN N. CRAMER.